(12) United States Patent
Wijnands et al.

(10) Patent No.: US 11,695,690 B1
(45) Date of Patent: Jul. 4, 2023

(54) NETWORK ADDRESS TRANSLATION WITH IN-BAND RETURN PATH RESOLUTION

(71) Applicant: GRAPHIANT, INC., Fremont, CA (US)

(72) Inventors: Ijsbrand Wijnands, Leuven (BE); Stefan Olofsson, Dubai (AE); Khalid Raza, Milpitas, CA (US); Neale Ranns, Hure (FR)

(73) Assignee: GRAPHIANT, INC., Fremont, CA (US)

( * ) Notice: Subject to any disclaimer, the term of this patent is extended or adjusted under 35 U.S.C. 154(b) by 0 days.

(21) Appl. No.: 17/521,672

(22) Filed: Nov. 8, 2021

(51) Int. Cl.
| | |
|---|---|
| *H04L 45/42* | (2022.01) |
| *H04L 45/745* | (2022.01) |
| *H04L 67/104* | (2022.01) |
| *H04L 12/46* | (2006.01) |
| *H04L 45/24* | (2022.01) |
| *H04L 45/50* | (2022.01) |

(52) U.S. Cl.
CPC .......... *H04L 45/42* (2013.01); *H04L 12/4633* (2013.01); *H04L 45/24* (2013.01); *H04L 45/745* (2013.01); *H04L 67/104* (2013.01); *H04L 45/50* (2013.01)

(58) Field of Classification Search
CPC ..... H04L 45/42; H04L 12/4633; H04L 45/24; H04L 45/745; H04L 67/104; H04L 45/50
See application file for complete search history.

(56) References Cited

U.S. PATENT DOCUMENTS

| | | | | |
|---|---|---|---|---|
| 8,289,968 | B1* | 10/2012 | Zhuang | H04L 61/2539 370/252 |
| 2005/0226144 | A1* | 10/2005 | Okita | H04L 45/586 370/251 |
| 2005/0265354 | A1* | 12/2005 | Ryu | H04L 61/10 370/395.52 |
| 2006/0056297 | A1* | 3/2006 | Bryson | H04L 63/0272 370/230 |
| 2008/0225888 | A1* | 9/2008 | Valluri | H04L 12/66 370/466 |
| 2012/0082146 | A1* | 4/2012 | Andreasen | H04L 45/26 370/389 |
| 2017/0346787 | A1* | 11/2017 | Menon | H04L 45/38 |
| 2019/0097968 | A1* | 3/2019 | Inforzato | H04L 61/256 |
| 2021/0099360 | A1* | 4/2021 | Parsons | H04L 12/2854 |

* cited by examiner

*Primary Examiner* — Mohamed A. Wasel
(74) *Attorney, Agent, or Firm* — Maschoff Brennan

(57) ABSTRACT

Embodiments of a method of communicating a packet by a network address translation (NAT) enabled router, are described. In an embodiment, the method includes receiving a return packet to be communicated to a destination. The destination is associated with a first source address in the context of a forward packet. The method further includes determining a return path to transmit the return packet to the destination based on security association data. The security association data is pre-recorded in a routing table of the NAT enabled router when the forward packet is received, prior to receiving the return packet, over a forward path established between the NAT enabled router and an enterprise node. The security association data uniquely identifies the forward path as the return path.

22 Claims, 4 Drawing Sheets

NETWORK ADDRESS TRANSLATION WITH IN-BAND RETURN PATH RESOLUTION

FIELD OF THE INVENTION

The embodiments discussed in the present disclosure are generally related to providing network address translation. In particular, the embodiments discussed are related to providing network address translation with in-band return path resolution in networks.

BACKGROUND OF THE INVENTION

Enterprises and customers can choose from a variety of communication capabilities and network services provided by service providers. Having multiple service providers and network devices in a communication network present various problem, such as problems with network addresses for communication over networks. For example, there is a limited supply of network addresses, such as Internet Protocol (IP) addresses. This problem is generally addressed by using network address translation (NAT) between public and private networks. By using NAT between public and private networks, addresses can be reused in various networks which increases the possible supply and use of virtual network addresses.

Translators of network addresses may provide a capability of communicating between devices on an internal network using address information from an external network. It is also possible to translate network addresses of multiple network devices on an internal network (referred to as internal network addresses) into an external network address by converting the internal network addresses into the external network address. During communication between network devices, a return path is to be determined for each packet and it may be challenging for the destination device to record each received data packet and to create/maintain a routing state for the received data packet. It is expected that a destination address of the destination device may be reached through routing. However, if there are many devices connected to a NAT enabled device, large amount of data in the form of routing states (for address conservation) needs to be maintained and managed (through some protocols) by the NAT enabled device. Existing state-based solutions are, therefore, not ideal for a scalable network due to inherent overheads associated with routing. In addition, the existing solution may pose a risk to customer data security or confidentiality in certain circumstances.

SUMMARY OF THE INVENTION

Embodiments of a network address translation with in-band return path resolution are disclosed that address at least some of the above-mentioned challenges and issues.

In accordance with the embodiments of this disclosure, a method of communicating a packet by a network address translation (NAT) enabled router is disclosed. The method includes receiving a return packet to be communicated to a destination. The destination is associated with a first source address in the context of a forward packet. The method further includes determining a return path to transmit the return packet to the destination based on security association data. The security association data is pre-recorded in a routing table of the NAT enabled router when the forward packet is received, prior to receiving the return packet, over a forward path established between the NAT enabled router and an enterprise node. The security association data uniquely identifies the forward path as the return path.

In accordance with the embodiments of this disclosure, an additional method of communicating a packet by a NAT enabled router is disclosed. The method includes receiving a return packet to be communicated to a destination. The destination is associated with a first source address in the context of a forward packet. The method further includes determining a return path to transmit the return packet to the destination based on one or more identifiers. The one or more identifiers are pre-recorded in a routing table of the NAT enabled router when a forward packet is received prior to receiving the return packet. The one or more identifiers are determined from the forward packet.

In accordance with the embodiments of this disclosure, yet another method of communicating a packet by a NAT enabled router is disclosed. The method includes receiving a return packet to be communicated to a destination. The destination is associated with a first source address in the context of a forward packet. The method further includes determining a return path to transmit the return packet to the destination based on one or more identifiers. The one or more identifiers are pre-recorded in a routing table of the NAT enabled router when a forward packet is received prior to receiving the return packet. The one or more identifiers are determined from the forward packet. The method further includes receiving, from a core node, the forward packet that includes at least the first source address and a first destination address. The method further includes determining the one or more identifiers from the forward packet. The method further includes recording the one or more identifiers in the routing table of the NAT enabled router. The one or more identifiers identify a routing path, through which the forward packet was received, as the return path. The method further includes performing network address translation (NAT) to replace the first source address included in the forward packet with a NAT translated first source address. The method further includes transmitting the forward packet, with the NAT translated first source address, to the first destination address.

BRIEF DESCRIPTION OF THE DRAWINGS

Further advantages of the invention will become apparent by reference to the detailed description of preferred embodiments when considered in conjunction with the drawings.

DETAILED DESCRIPTION

Figure 1:
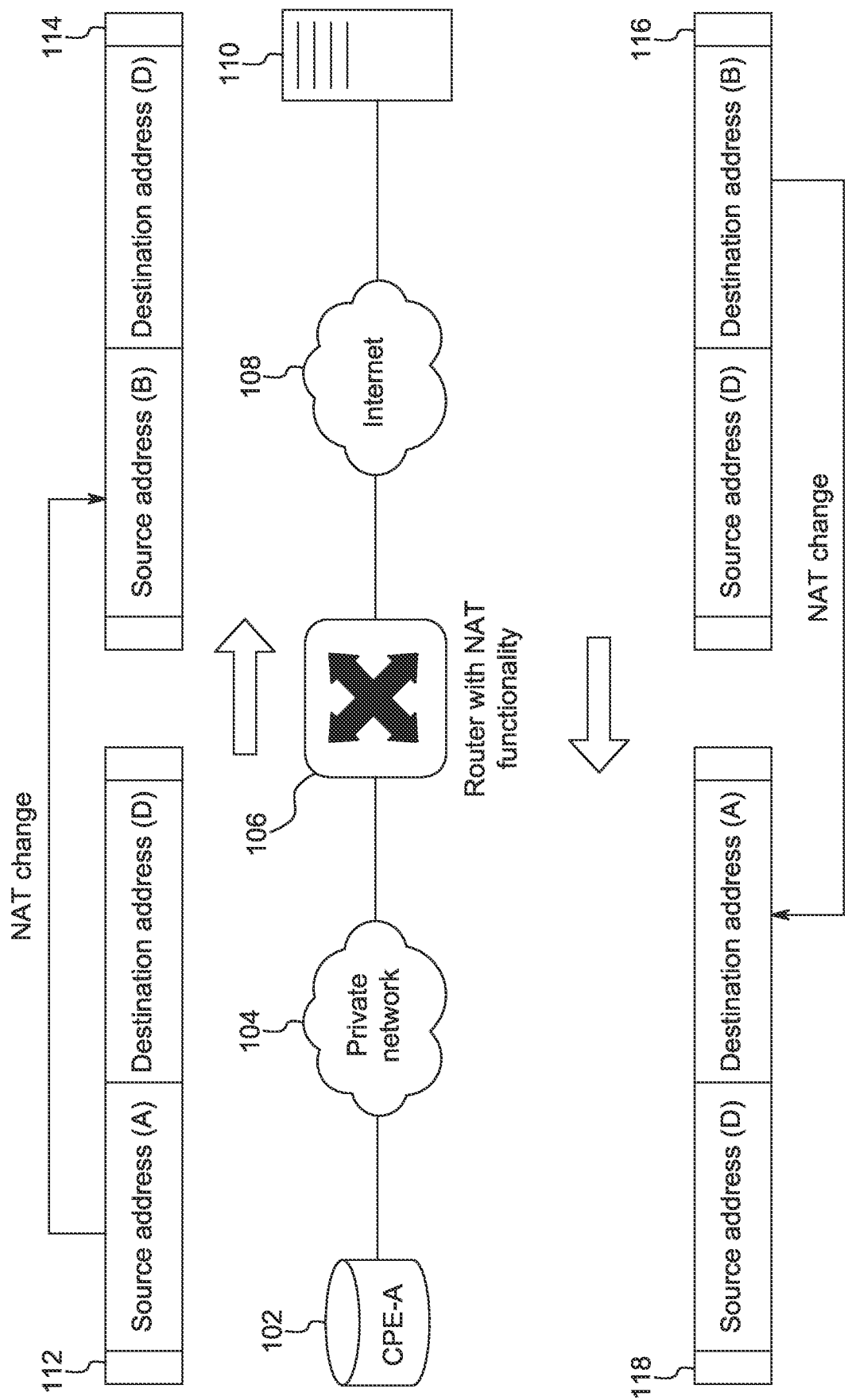
FIG. 1 illustrates an operating environment in which a network address translation (NAT) enabled router architecture may be implemented, according to an example embodiment.

The following detailed description is presented to enable any person skilled in the art to make and use the invention. For purposes of explanation, specific details are set forth to provide a thorough understanding of the present invention.

However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Any data traffic originating from a customer premises equipment (CPE) is directed through a router or network gateway to its intended destination. Additionally, the router may perform network address translation (NAT) and may use a network address translation routing table to identify a destination node to which data traffic is destined for. NAT complements the function of routing, which sends the data packet to its destination, and completes the routing process. In a standard NAT approach, traffic upstream and downstream are forwarded by using a pre-established routing table. The disclosed architecture provides a method to support return routing of data packets. Embodiments of the present disclosure modify a NAT function by adding contextual awareness to a NAT entry. Contextual awareness may include a variety of information including, but not limited to, tunnels, labels, identifiers, VPN, branch node, branch router details, ingress router details, security association data, or any other information used in a forward path. The return routing information may be determined by looking at the NAT entry created at the time of forwarding of the data packet.

The disclosed architecture provides a network address translation (NAT) enabled router that may be located between a CPE and a destination node. The NAT enabled router may include one or more processors and a memory in communication with at least one processor of the one or more processors storing computer-executable instructions that, when executed, cause the processor to receive a return packet to be communicated to a destination. The destination is associated with a first source address in the context of a forward packet. The computer-executable instructions further cause the processor to determine a return path to transmit the return packet to the destination based on security association data. The security association data is pre-recorded in a routing table of the NAT enabled router when a forward packet is received, prior to receiving the return packet, over a forward path. The forward path is established between the NAT enabled router and an enterprise node, and the security association data uniquely identifies the forward path as also the return path.

In yet another embodiment, the NAT enabled router may include one or more processors and a memory in communication with at least one processor of the one or more processors storing computer-executable instructions that when executed, cause the processor to receive a return packet to be communicated to a destination. The destination is associated with a first source address in the context of a forward packet. The computer-executable instructions further cause the processor to determine a return path to transmit the return packet to the destination based on one or more identifiers. The one or more identifiers are pre-recorded in a routing table of the NAT enabled router when a forward packet is received prior to receiving the return packet. The one or more identifiers are determined from the forward packet.

Certain terms and phrases have been used throughout the disclosure and will have the following meanings in the context of the ongoing disclosure.

A "network" may refer to a series of nodes or network elements that are interconnected via communication paths. The network may include any number of software and/or hardware elements coupled to each other to establish the communication paths and route data/traffic via the established communication paths.

A "service provider" may refer to an entity providing, managing, and/or operating a core network. The Service providers (SPs) in the present disclosure may include but are not limited to Secure Access Service Edge (SASE) providers, Network as a Service (NaaS) providers, Internet Service Provider (ISP), Managed Service Provider (MSP), MPLS VPN providers, and Software Defined Wide Area Network (SD-WAN) providers.

A "core network" may refer to a network infrastructure that may connect one or more enterprise networks with each other. The core network represents a central or core element that provides paths for the exchange of information between different networks. Therefore, the core network may be interchangeably referred herein as the "service provider network", "service provider core network/SP core network", "service provider core/SP core", or "backbone" without departing from the scope of the ongoing description. The core network may include but is not limited to segment routed Multiprotocol Label Switching (MPLS) network, Internet Protocol (IP) version 6 (IPv6) segment routed network, IP version 4 (IPv4) segment routed network, and Path Computation Element (PCE) based segment routed network.

An "enterprise network" may refer to a network owned and/or managed by customers, which may include one or more business entities requiring network infrastructure (such as a core network) to provide connectivity among users, devices, and applications that are local to the enterprise.

A "data packet" refers to data or information that is transmitted over a network. The data packet may include a metadata portion and a payload portion. The metadata portion may include one or more headers and the payload portion may include data (e.g., customer related data). Such data included in the payload portion may be sensitive and/or confidential and may need to be protected from any attack or impersonation by external or suspicious parties. Here, the data packet in its entirety, that is, including the metadata and payload portions, may also be referred to as a "data packet". In other words, the original data packet refers to a data packet originated by an endpoint device. The data packet may be a unicast data packet depending on the unicast data transmission. The data packet may be encrypted and/or encapsulated to enhance security in the data packet. The data packet may include one or more identifiers to enable routing of the data packet from one point to another point in a network.

A "forward packet" refers to a data packet that is sent by a CPE to a NAT device and then from the NAT device to a destination node, such as a server. The forward packet can be directly sent from the CPE using a P2P tunnel to the NAT device or forwarded by using a hop-by-hop method using a core network to the NAT device.

A "return packet" refers to a data packet that is sent by the destination node such as a server to the NAT device and then from the NAT device to the CPE, from where the forward packet originated. The return packet can be directly sent to the CPE using a P2P tunnel from the NAT device or forwarded by using a hop-by-hop method using the core network from the NAT device.

A "forward path" refers to a path used by the forward data packet from the CPE to the NAT device and then from the NAT device to the destination node. The forward path can be the P2P tunnel or the hop-by-hop method using the core network.

A "return path" refers to a path used by the return data packet from the destination node to the NAT device and then from the NAT device to the CPE. The return path can be the P2P tunnel or a hop-by-hop method using the core network.

Further, the terms "data" or "traffic" are interchangeably used in this disclosure and refer to any type of information, such as but not limited to messages, voice, video, media, or any other information in any appropriate format that may be communicated from one point to another.

An "endpoint device" may be any device associated with customers, individuals, or end users. The endpoint device may be a device from where the data packet originates for transmission or a device that receives the data packet after transmission as an intended destination. The endpoint device may be connected to any customer premises equipment (CPE) and accordingly, the endpoint device may be a source node and/or a destination node to transmit and/or receive data packets from the CPEs via the core network. The endpoint device may include, but is not limited to, a device such as a computer, a personal digital assistant (PDA), a laptop, a cellular telephone, a tablet, or any other device or network element capable of initiating or exchanging data within one or more communication networks.

"Cx" refers to core nodes (e.g., C1, C2, C3) in the core network. A "core node" may refer to any node capable of routing data within the core network, such as, but not limited to, an access point, a router, a bridge, a server, a gateway, a switch, a modem, a relay, or a hub.

Any core node may be an ingress core node/PE which handles incoming traffic from another network, or an egress core node/PE which handles outgoing traffic to another network.

A CPE may include any device that is located within the premises of a customer's enterprise network. An ingress CPE may receive data packets originated from an endpoint device and perform encryption/encapsulation on the received data packets to create encrypted/encapsulated data packet(s). The ingress CPE may send the encrypted/encapsulated data packet(s) towards the core nodes. An egress CPE may receive the encrypted/encapsulated data packet(s) from the core nodes, decrypt/decapsulate the encrypted/encapsulated data packets, and transmit the plain data packets to an intended destination node/endpoint device.

"Ax" refers to CPEs of customer enterprise A. For example, A1, A2, and A3 refer to CPEs for a customer enterprise A. Similarly, "Bx" refers to CPEs of customer enterprise B.

Although the identifiers defined in the disclosure are represented as Multiprotocol Label Switching (MPLS) labels for illustration throughout the disclosure, but without deviating from the scope of the ongoing disclosure, the identifiers can be MPLS Labels, IPv4/IPv6 addresses, or a combination thereof.

Embodiments of a method of communicating a packet by a network address translation (NAT) enabled router, are disclosed. In accordance with the embodiments of this disclosure, the NAT enabled router may, therefore, receive a return packet to be communicated to a destination. The destination is associated with a first source address in the context of a forward packet. The NAT enabled router further determines a return path to transmit the return packet to the destination based on security association data. The security association data is pre-recorded in a routing table of the NAT enabled router when the forward packet is received, prior to receiving the return packet, over a forward path established between the NAT enabled router and an enterprise node. The security association data uniquely identifies the forward path as the return path.

In the above-described embodiments, the forward path includes a point-to-point (P2P) tunnel between the enterprise node and the NAT enabled router. In an embodiment, the security association data includes an identifier that uniquely identifies the P2P tunnel. In an embodiment, the forward packet includes information associated with a virtual private network (VPN) address. The VPN address is associated with the forward packet, and a branch node or the CPE-A 102 from where the forward packet originated. The forward packet includes at least the first source address and a first destination address.

In the above-described embodiments, the NAT enabled router further records security association data. The security association data is associated with a respective forward path between the NAT enabled router and each of a plurality of enterprise nodes connected thereto, in the routing table of the NAT enabled router. The NAT enabled router further transmits the return packet to the destination based on the determined return path.

In another embodiment, the NAT enabled router further performs network address translation (NAT) to replace the first source address included in the forward packet with a NAT translated first source address. The NAT enabled router further transmits the forward packet, with the NAT translated first source address, to the first destination address.

Embodiments of a method of communicating a packet by a network address translation (NAT) enabled router, are disclosed. In accordance with the embodiments of this disclosure, the NAT enabled router may, therefore, receive a return packet to be communicated to a destination. The destination is associated with a first source address in the context of a forward packet. The NAT enabled router determines a return path to transmit the return packet to the destination based on one or more identifiers. The one or more identifiers are pre-recorded in a routing table of the NAT enabled router when a forward packet is received prior to receiving the return packet. The one or more identifiers are determined from the forward packet.

In the above-described embodiments, the forward packet includes at least the first source address and a first destination address. The NAT enabled router further creates a NAT translation entry in the routing table of the NAT enabled router to obtain a NAT translated first source address when the forward packet is received.

In the above-described embodiments, the NAT enabled router further adds to the NAT translation entry, the one or more identifiers determined from the forward packet. The one or more identifiers include information of at least one multiprotocol label switching (MPLS) label determined from the forward packet.

In the above-described embodiments, the NAT enabled router further receives from a core node, the forward packet. The forward packet includes at least the first source address and a first destination address. The NAT enabled router determines the one or more identifiers from the forward packet and records the one or more identifiers in the routing table of the NAT enabled router. The one or more identifiers identify a routing path, through which the forward packet was received, as the return path. The NAT enabled router performs network address translation (NAT) to replace the first source address included in the forward packet with a NAT translated first source address. Further, the NAT enabled router transmits the forward packet, with the NAT translated first source address, to the first destination address.

Embodiments of a network address translation (NAT) enabled router are disclosed, in accordance with the embodiments of this disclosure, the NAT enabled router may include a one or more processors and a memory in communication with at least one processor of the one or more processors storing computer-executable instructions that when executed, cause the processor to receive a return packet to be communicated to a destination. The destination is associated with a first source address in the context of a forward packet. The computer-executable instructions further cause the processor to determine a return path to transmit the return packet to the destination based on security association data. The security association data is pre-recorded in a routing table of the NAT enabled router when a forward packet is received, prior to receiving the return packet, over a forward path. The forward path is established between the NAT enabled router and an enterprise node, and the security association data uniquely identifies the forward path as the return path.

In the above-described embodiments, the forward path includes a point-to-point (P2P) tunnel between the enterprise node and the NAT enabled router. The security association data includes an identifier that uniquely identifies the P2P tunnel.

In the above-described embodiments, the forward packet includes at least the first source address and a first destination address. The return packet includes at least a second source address and a second destination address. The at least one processor is configured to perform network address translation (NAT) to replace the first source address included in the forward packet with a NAT translated first source address. The second destination address corresponds to the NAT translated first source address of the forward packet.

In the above-described embodiments, the security association data enables the NAT enabled router to route the return packet to the destination without performing route lookup for the second destination address corresponding to the NAT translated first source address. The security association data has information associated with encapsulation of the forward packet in a data plane.

Embodiments of a network address translation (NAT) enabled router are disclosed, in accordance with the embodiments of this disclosure, the NAT enabled router may include a one or more processors and a memory in communication with at least one processor of the one or more processors storing computer-executable instructions that when executed, cause the processor to receive a return packet to be communicated to a destination. The destination is associated with a first source address in the context of a forward packet. The computer-executable instructions further cause the processor to determine a return path to transmit the return packet to the destination based on one or more identifiers. The one or more identifiers are recorded in a routing table of the NAT enabled router when a forward packet is received prior to receiving the return packet. The one or more identifiers are determined from the forward packet.

In the above-described embodiments, the one or more identifiers include one of: multiprotocol label switching (MPLS) labels and information associated with a data plane.

In the above-described embodiments, the at least one processor is further configured to determine one or more MPLS labels as the one or more identifiers in the forward packet when the forward packet is received by the NAT enabled router with an MPLS label stack.

In the above-described embodiments, the computer-executable instructions further cause the processor to create a NAT translation entry for translation of the first source address in the routing table of the NAT enabled router to obtain a NAT translated first source address, when the forward packet is received. The computer-executable instructions further cause the processor to add the one or more identifiers to the created NAT translation entry to determine the return path for the return packet.

In the above-described embodiments, the computer-executable instructions further cause the processor to create a NAT translation entry for translation of the first source address in the routing table of the NAT enabled router to obtain a NAT translated first source address, when the forward packet is received. The computer-executable instructions further cause the processor to create a return path made up of a tunnel that is referenced in the NAT translation entry without a security association data.

In the above-described embodiments, the one or more identifiers enable the NAT enabled router to route the return packet to the destination without performing an internet protocol (IP) header lookup for a second destination address included in the return packet, and wherein the second destination address corresponds to the NAT translated first source address of the forward packet.

The various embodiments throughout the disclosure will be explained in more detail with reference to FIGS. 1-5.

FIG. 1 illustrates an operating environment in which a network address translation (NAT) enabled router architecture may be implemented, according to an example embodiment.

The operating environment includes a customer premises equipment CPE-A 102 or an enterprise node that sends a data packet to a network address translation (NAT) enabled router 106 or a router with NAT functionality or a gateway using a private network 104. The data packet is destined for a server 110 or a destination node accessed through an internet network 108 in a forward path.

In one embodiment, the data packet has a label with a header 112 that includes a source address (A) and a destination address (D). The NAT enabled router 106 implements changes in the label of the data packet to include a header 114 with a source address (B) and the destination address (D) while sending the data packet to the server 110. The NAT enabled router 106 performs network address translation (NAT) to replace the source address included in the forward packet with a NAT translated source address in the forward path. In a return path, the data packet has the label with a header 116 that includes a source address (D) and a destination address (B) as it is sent by the server 110 to the NAT enabled router 106. The NAT enabled router 106 implements changes in the label of the data packet as per the embodiments of the present disclosure to include a header 118 with the NAT translated source address as the source address (D) and a destination address (A) while sending the data packet to the CPE-A 102.

The NAT enabled router 106 determines the return path to transmit the data packet as a return packet to the destination based on one or more identifiers. In an embodiment, the one or more identifiers are recorded in a routing table of the NAT enabled router 106 when the data packet as a forward packet is received, prior to receiving the return packet. The one or more identifiers are determined from the forward packet based on which the return packet is sent to its destination, the CPE-A 102.

Figure 2:
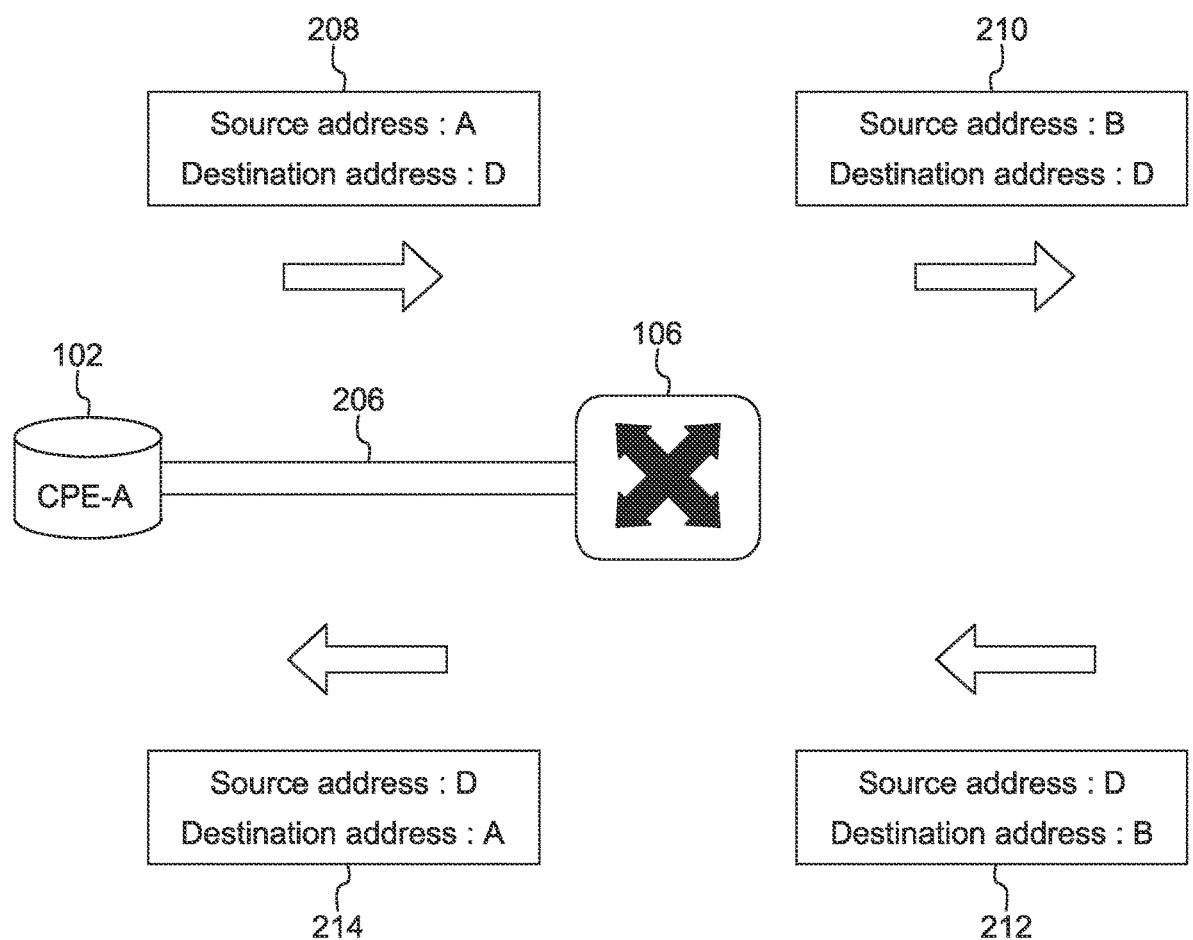
FIG. 2 illustrates an example network topology for a NAT enabled router according to an embodiment.

FIG. 2 illustrates an example network topology for the NAT enabled router according to an embodiment. FIG. 2 will be explained in conjunction with description of FIG. 1. Specifically, components having the same name are to be understood as similar in functionality and characteristics. As depicted in FIG. 2, the network topology includes the customer premises equipment CPE-A 102 that sends the data packet to the network address translation (NAT) enabled router 106 through a network 206.

In an embodiment, the CPE-A 102 sends the forward packet to the NAT enabled router 106 destined for the server 110 over the forward path. The forward path includes a point-to-point (P2P) tunnel between the CPE-A 102 and the NAT enabled router 106. The NAT enabled router 106 receives the forward packet having a header 208 with a source address A and a destination address D. The NAT enabled router 106 performs network address translation (NAT) to replace the source address A included in the forward packet with a NAT translated source address and transmits the forward packet having a header 210, with the NAT translated source address as a source address B, to the destination node (server 110). Further, the NAT enabled router 106 receives from the server 110 the return packet having a header 212 with a source address D and a destination address B, to be communicated to a destination (CPE-A 102). The NAT enabled router 106 determines the return path to transmit the return packet to the destination based on security association data. The return packet with a header 214 with the source address D and a destination address B is communicated to the CPE-A 102.

The security association data is pre-recorded in a routing table of the NAT enabled router 106 when the forward packet is received, prior to receiving the return packet. The security association data includes an identifier that uniquely identifies the P2P tunnel. The forward packet includes information associated with a virtual private network (VPN) address. The VPN address may be associated with the forward packet, and a branch node or the CPE-A 102 from where the forward packet originated. The forward packet includes at least the source address A and the destination address D. The security association data is pre-recorded over the forward path established between the NAT enabled router 106 and the CPE-A 102. In an embodiment, the security association data uniquely identifies the forward path as the return path and due to this correlation, there is no need to store the routing table for routing the return packet.

When there is a P2P tunnel between the CPE-A 102 and the NAT enabled router 106, there is a direct communication between the two devices. The data packet traffic sent from the CPE-A 102 to the NAT enabled router 106 must be returned over the same P2P tunnel. A P2P tunnel interface is recorded as an extra data set inside NAT translation entries when traffic is received on the P2P tunnel (and NAT translated). To forward the return packet traffic back to the intended destination address, the recorded P2P tunnel interface may be used. Due to the previously recorded P2P tunnel interface, the NAT enabled router 106 does not need to perform a route lookup on the destination address (after the NAT translation), and it can immediately determine which P2P tunnel to use for the return packet.

In one illustrative example, a forward packet from the CPE-A 102 may have the header 208 with a first source address: 10.0.0.1 and a first destination address: 200.100.10.1 to be send to the NAT enabled router 106. The NAT enabled router 106 performs the network address translation as per an embodiment of the present disclosure and replaces the first source address included in the forward packet with a NAT translated first source address: 150.150.0.1. The forward packet including the NAT translated first source address along with the first destination address in the header 210 is transmitted to the server 110. Return packet from the server 110 having the header 212 with a second source address: 200.100.10.1 (that corresponds to the NAT translated first source address) and a second destination address: 150.150.0.1 is received by the NAT enabled router 106. The NAT enabled router 106 determines a return path to transmit the return packet to destination (the CPE-A 102) based on security association data. The security association data is pre-recorded in a routing table of the NAT enabled router 106 when a forward packet is received, prior to receiving the return packet. The security association data, received over a forward path established between the NAT enabled router 106 and the CPE-102, uniquely identifies the forward path as the return path. The return packet with the header 214 is communicated to a final destination address: 10.0.0.1 that corresponds to the original first source address.

Figure 3:
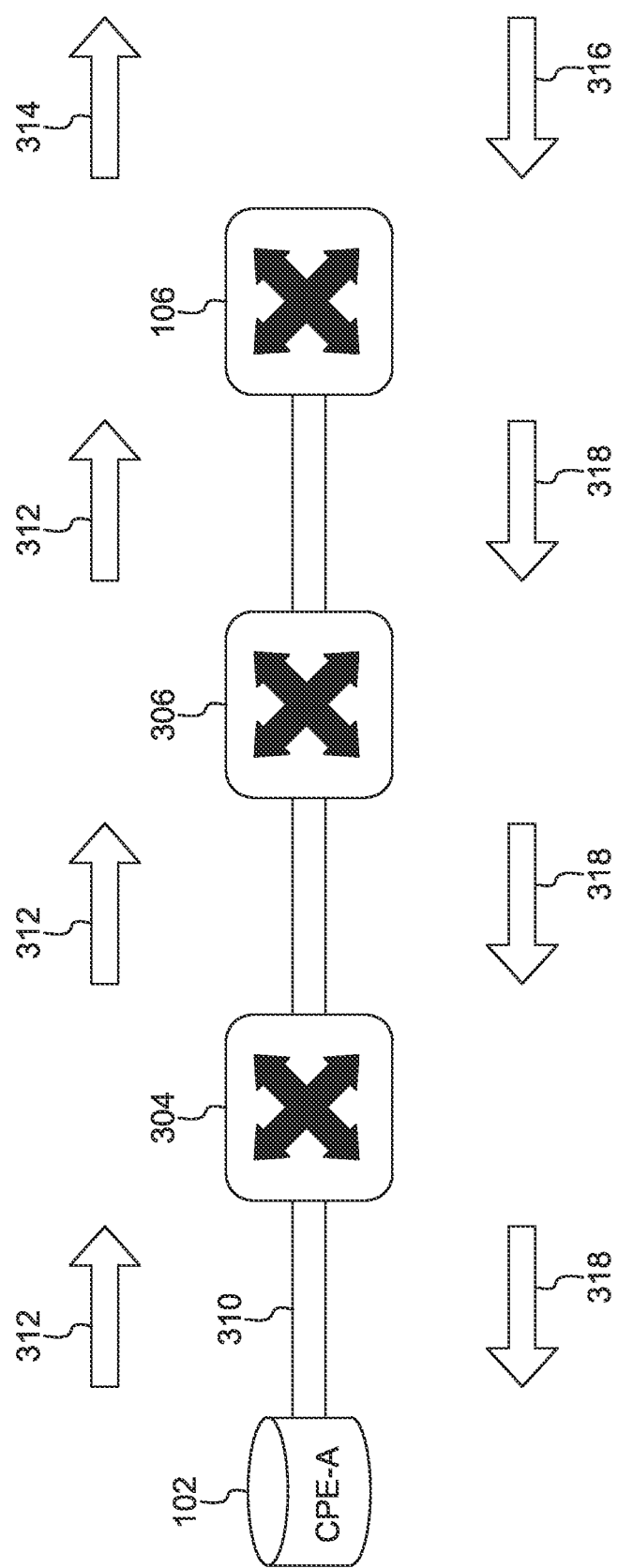
FIG. 3 illustrates another example network topology for a NAT enabled router according to an embodiment.

FIG. 3 illustrates another example network topology for the NAT enabled router 106 according to an embodiment. FIG. 3 will be explained in conjunction with description of FIG. 1. Specifically, components having the same name are to be understood as similar in functionality and characteristics. As depicted in FIG. 3, the network topology includes the customer premises equipment CPE-A 102 that sends the data packet to the network address translation (NAT) enabled router 106 over a network 310 and via core nodes 304 and 306, and the like.

In an embodiment, the CPE-A 102 sends the forward packet to the NAT enabled router 106 destined for the server 110 or end point node or destination node in an enterprise network via one or more core nodes 304 and 306. In this embodiment, there may not be any P2P tunnel between the CPE-A 102 and the NAT enabled router 106. The NAT enabled router 106 receives the forward packet having a header 312 with a first source address and a first destination address from the core node 306. The core node 306 receives the forward packet with the header 312 from the core node 304. The core node 304 receives the forward packet with the header 312 from the CPE-A 102. The NAT enabled router 106 performs network address translation (NAT) to replace the first source address included in the forward packet with a NAT translated first source address and transmits the forward packet with a header 314 (including the NAT translated first source address) to the first destination address (e.g., the server 110).

Further, the NAT enabled router 106 receives a return packet with a header 316 from the server 110, to be communicated to a destination. The destination is associated with the first source address in the context of the forward packet (e.g., the CPE-A 102 is the destination on a return path). The NAT enabled router 106 determines a return path to transmit the return packet with a header 318 to the destination with a NAT translated address. However, an immediate destination of the return packet with the header 318 may be the core node 306 in this embodiment. The core node 306 may not be able to route the return packet further towards the destination CPE-A 102 as it is stateless and may use multiprotocol label switching (MPLS). The same is true for other core nodes, such as the core node 304. In this embodiment, the NAT enabled router 106 determines the return path based on one or more identifiers. The one or more identifiers are recorded in a routing table of the NAT enabled router 106 when the forward packet was received, prior to receiving the return packet. The one or more identifiers are determined from the forward packet. Using the one or more identifiers, the core node 306 would be able to route the traffic further towards the CPE-A 102 via the core node 304 and so on.

When there is no P2P tunnel, the NAT enabled router 106 may not be able to send return packets to the CPE-A 102 via the core nodes 304 and 306 as the core nodes 304 and 306 do not have routing information to reach the CPE-A 102. The routing reachability here, refers to an ability to determine a route or path to the CPE-A 102 by the core nodes 304 and 306 in the core network. The core nodes 304 and 306 are stateless and use multiprotocol label switching (MPLS). For the return traffic to traverse the core nodes 304 and 306, MPLS labels need to be added to the forward packet 304. The MPLS labels can be learned in-band, attached to the forward packet when the forward packet is received as part of an MPLS label stack. For example, generally it is not expected for a router or gateway to receive data packets with an MPLS label stack, before the final destination of the data packets. But if the router or the gateway receives the data packets with an MPLS label stack, the router or the gateway automatically assumes that the remaining labels, that are not used in the forward path, must be used for the return path traffic. The forward packet includes at least the first source address and the first destination address. The NAT enabled router 106 creates a NAT translation entry in the routing table to obtain a NAT translated first source address. The NAT enabled router 106 adds to the NAT translation entry, the one or more identifiers determined from the forward packet.

In one example, a forward packet from the CPE-A 102 has the header 312 with a first source address: 10.0.0.1 and a first destination address: 200.100.10.1 to be send to the NAT enabled router 106. The NAT enabled router 106 performs the network address translation as per an embodiment of the present disclosure and replaces the first source address included in the forward packet with a NAT translated first source address: 150.150.0.1. The NAT enabled router 106 transmits the forward packet with the NAT translated first source address along with the first destination address in the header 314 to the server 110.

In one embodiment, the NAT enabled router 106 creates a NAT translation entry in the routing table to obtain a NAT translated first source address in a forward path. A return path is made up of a tunnel that is referenced in the NAT translation entry without a security association data.

In one example, a return packet from the server 110, with the header 316 having a second source address: 200.100.10.1 and a second destination address: 50.150.0.1 that corresponds to the NAT translated first source address is received by the NAT enabled router 106. The NAT enabled router 106 determines the return path to transmit the return packet to the destination CPE-A 102 based on one or more identifiers. The one or more identifiers are recorded in a routing table of the NAT enabled router 106 when the forward packet is received prior to receiving the return packet. The one or more identifiers are determined from the forward packet and uniquely identifies the forward path as the return path. Accordingly, the return packet with the header 318 is communicated to a final destination address: 10.0.0.1 that corresponds to original first source address.

In an embodiment, the core network may represent a network owned, managed, and/or operated by a service provider to provide connectivity services to one or more customers, such as customer enterprise A. The core network includes one or more core nodes, generally referred to as core nodes. The core nodes may include nodes 304 and 306, as depicted in FIG. 3. Although two core nodes are depicted in FIG. 3, any number of core nodes may be included in the core network without departing from the scope of the ongoing description.

In an embodiment, the core network is a label switched network and enables establishment of a full mesh of label switched paths between the core nodes to route traffic. Further, without any limitation, the core network may be a segment routed MPLS network, an IPv4/IPv6 segment routed network, or PCE based segment routed network.

In an embodiment, the enterprise network may be a local area network (LAN), a WAN, or a private network based on operational requirements of an enterprise A. In an embodiment, the enterprise A may be a customer of the service provider providing the core network. In an embodiment, the enterprise A may be an enterprise managing the core network and acting as the service provider.

The step-by-step process to route the data packet from one point to another using the network address translation (NAT) with in-band return path resolution architecture will be explained in subsequent figures and associated description.

Figure 4:
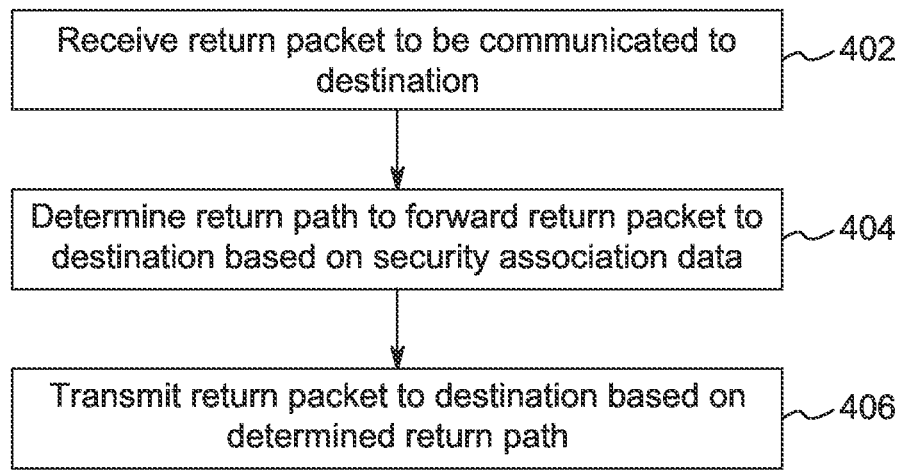
FIG. 4 illustrates an exemplary method for network address translation by a NAT enabled router, in accordance with an embodiment.

FIG. 4 illustrates an exemplary method for network address translation by the NAT enabled router, in accordance with an embodiment.

The method of communicating the data packet by the network address translation (NAT) enabled router 106 may begin at step 402 where the NAT enabled router 106 receives the return packet to be communicated to the destination. For example, the NAT enabled router 106 receives the return packet with the header 316, to be communicated to the destination CPE-A 102. The destination CPE-A 102 is associated with the first source address in the context of the forward packet.

At step 404, the NAT enabled router 106 determines the return path to transmit the return packet to the destination based on security association data. For example, the NAT enabled router 106 determines the return path to transmit the return packet with the header 318 to the destination CPE-A 102 based on security association data. The security association data is pre-recorded in a routing table of the NAT enabled router 106 when the forward packet is received, prior to receiving the return packet. The security association data includes an identifier that uniquely identifies the P2P tunnel. The forward packet includes information associated with a virtual private network (VPN) address. The VPN address is associated with the forward packet, and a branch node or the CPE-A 102 from where the forward packet originated. The forward packet includes at least the first source address and the first destination address. The security association data is pre-recorded over a forward path established between the NAT enabled router 106 and the destination CPE-A 102. The security association data uniquely identifies the forward path as the return path.

At step 406, the NAT enabled router 106 transmits the return packet to the destination based on the determined return path. For example, the NAT enabled router 106 transmits the return packet to the destination CPE-A 102 based on the determined return path.

Figure 5:
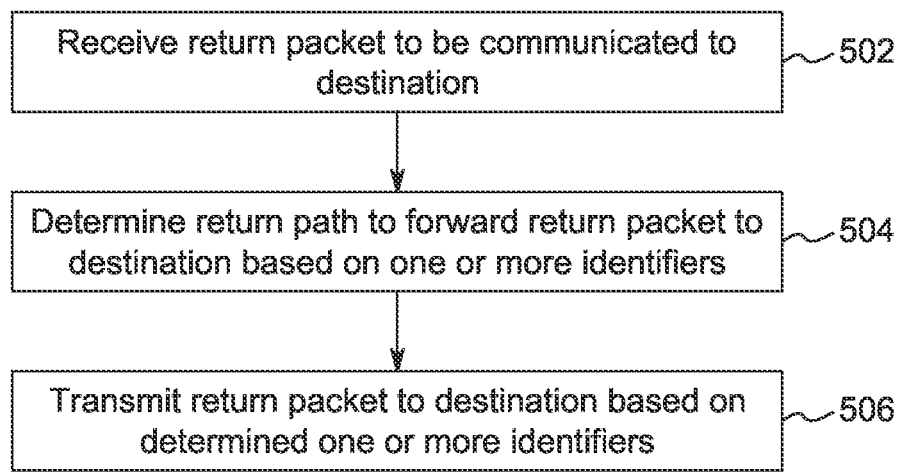
FIG. 5 illustrates another exemplary method for network address translation by a NAT enabled router, in accordance with an embodiment.

FIG. 5 illustrates another exemplary method for network address translation by the NAT enabled router 106, in accordance with an embodiment.

The method of communicating the data packet by the network address translation (NAT) enabled router 106 may begin at step 502 where the NAT enabled router 106 receives the return packet to be communicated to the destination. For example, the NAT enabled router 106 receives the return packet with the header 316, to be communicated to the destination CPE-A 102 via core nodes 304 and 306. The destination CPE-A 102 is associated with the first source address in the context of the forward packet, from the server 110.

At step 504, the NAT enabled router determines the return path to transmit the return packet to the destination based on one or more identifiers. For example, the NAT enabled router 106 determines the return path to transmit the return packet with the header 318 to the destination CPE-A 102. However, an immediate destination (or hop) for the return packet with the header 316 is the core node 306. The core node 306 may not be able to route the traffic further towards the CPE-A 102 as the core node 306 is stateless. In accordance with the present disclosure, the NAT enabled router 106 determines the return path based on one or more identifiers. The one or more identifiers are recorded in a routing table of the NAT enabled router 106 when the forward packet is received, prior to receiving the return packet. The one or more identifiers are determined from the forward packet. Using the one or more identifiers, the core node 306 would be able to route the traffic further towards the CPE-A 102 via the core node 304 or the like. The one or more identifiers have information of at least one multiprotocol label switching (MPLS) label determined from the forward packet.

At step 506, the NAT enabled router 106 transmits the return packet to the destination based on the determined one or more identifiers. For example, the NAT enabled router 106 transmits the return packet to the destination CPE-A 102 based on the determined return path via the core nodes 304 and 306.

The disclosed methods may be performed by processing logic that may include hardware (circuitry, dedicated logic, etc.), software (such as run on a general-purpose computer system or a dedicated machine), or a combination of both. The processing logic may be included in any node or device (e.g., core node, CPEs, controller etc.), or any other computing system or device. A person with ordinary skill in the art will appreciate that the disclosed method is capable of being stored on an article of manufacture, such as a non-transitory computer-readable medium. In an embodiment, the article of manufacture may encompass a computer program accessible from a storage media or any computer-readable device.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step being referred to is an optional (not required) feature of the invention.

The present disclosure has been described with reference to various specific and preferred embodiments and techniques. However, many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, the various embodiments of the SP network architecture described herein contain optional features that can be individually or together applied to any other embodiment shown or contemplated here to be mixed and matched with the features of that architecture.

While the invention has been described with respect to a limited number of embodiments, those skilled in the art, having benefit of this disclosure, will appreciate that other embodiments can be devised which do not depart from the scope of the invention as disclosed herein.

We claim:

1. A method of communicating a packet by a network address translation (NAT) enabled router, the method comprising:
    receiving a return packet to be communicated to a destination, wherein the destination is associated with a first source address in the context of a forward packet; and
    determining a return path to transmit the return packet to the destination based on security association data, wherein the security association data is pre-recorded in a routing table of the NAT enabled router when the forward packet is received, prior to receiving the return packet, over a forward path established between the NAT enabled router and an enterprise node, and wherein the security association data uniquely identifies the forward path as the return path.

2. The method according to claim 1, wherein the forward path comprises a point-to-point (P2P) tunnel between the enterprise node and the NAT enabled router, and wherein the security association data includes an identifier that uniquely identifies the P2P tunnel.

3. The method according to claim 1, further comprising recording security association data, associated with a respective forward path between the NAT enabled router and each of a plurality of enterprise nodes connected thereto, in the routing table of the NAT enabled router.

4. The method according to claim 1, further comprising transmitting the return packet to the destination based on the determined return path.

5. The method according to claim 1, wherein the forward packet comprises information associated with: a virtual private network (VPN) address associated with the forward packet, and a branch node from where the forward packet originated.

6. The method according to claim 1, wherein the forward packet includes at least the first source address and a first destination address.

7. The method according to claim 6, further comprising:
    performing network address translation (NAT) to replace the first source address included in the forward packet with a NAT translated first source address; and
    transmitting the forward packet, with the NAT translated first source address, to the first destination address.

8. A method of communicating a packet by a network address translation (NAT) enabled router, the method comprising:
receiving a return packet to be communicated to a destination, wherein the destination is associated with a first source address in the context of a forward packet; and
determining a return path to transmit the return packet to the destination based on one or more identifiers, wherein the one or more identifiers are pre-recorded in a routing table of the NAT enabled router when a forward packet is received prior to receiving the return packet, and wherein the one or more identifiers are determined from the forward packet.

9. The method according to claim 8, wherein the forward packet includes at least the first source address and a first destination address, the method further comprising creating a NAT translation entry in the routing table of the NAT enabled router to obtain a NAT translated first source address when the forward packet is received.

10. The method according to claim 9, further comprising adding, to the NAT translation entry, the one or more identifiers determined from the forward packet.

11. The method according to claim 8, wherein the one or more identifiers comprise information of at least one multiprotocol label switching (MPLS) label determined from the forward packet.

12. The method according to claim 8, further comprising:
receiving, from a core node, the forward packet, wherein the forward packet includes at least the first source address and a first destination address;
determining the one or more identifiers from the forward packet;
recording the one or more identifiers in the routing table of the NAT enabled router, wherein the one or more identifiers identify a routing path, through which the forward packet was received, as the return path;
performing network address translation (NAT) to replace the first source address included in the forward packet with a NAT translated first source address; and
transmitting the forward packet, with the NAT translated first source address, to the first destination address.

13. A network address translation (NAT) enabled router comprising:
one or more processors; and
a memory in communication with at least one processor of the one or more processors, wherein the at least one processor is configured to:
receive a return packet to be communicated to a destination, wherein the destination is associated with a first source address in the context of a forward packet; and
determine a return path to transmit the return packet to the destination based on security association data, wherein the security association data is pre-recorded in a routing table of the NAT enabled router when a forward packet is received, prior to receiving the return packet, over a forward path established between the NAT enabled router and an enterprise node, and wherein the security association data uniquely identifies the forward path as the return path.

14. The NAT enabled router according to claim 13, wherein the forward path comprises a point-to-point (P2P) tunnel between the enterprise node and the NAT enabled router, and wherein the security association data includes an identifier that uniquely identifies the P2P tunnel.

15. The NAT enabled router according to claim 13, wherein the forward packet includes at least the first source address and a first destination address, wherein the return packet includes at least a second source address and a second destination address, wherein the at least one processor is configured to perform network address translation (NAT) to replace the first source address included in the forward packet with a NAT translated first source address, and wherein the second destination address corresponds to the NAT translated first source address of the forward packet.

16. The NAT enabled router according to claim 15, wherein the security association data enables the NAT enabled router to route the return packet to the destination without performing route lookup for the second destination address corresponding to the NAT translated first source address.

17. The NAT enabled router according to claim 13, wherein the security association data comprises information associated with encapsulation of the forward packet in a data plane.

18. A network address translation (NAT) enabled router comprising:
one or more processors; and
a memory in communication with at least one processor of the one or more processors, wherein the at least one processor is configured to:
receive a return packet to be communicated to a destination, wherein the destination is associated with a first source address in the context of a forward packet; and
determine a return path to transmit the return packet to the destination based on one or more identifiers, wherein the one or more identifiers are pre-recorded in a routing table of the NAT enabled router when a forward packet is received prior to receiving the return packet, and wherein the one or more identifiers are determined from the forward packet.

19. The NAT enabled router according to claim 18, wherein the one or more identifiers comprise one of: multiprotocol label switching (MPLS) labels and information associated with a data plane.

20. The NAT enabled router according to claim 19, wherein the at least one processor is further configured to determine one or more MPLS labels as the one or more identifiers in the forward packet when the forward packet is received by the NAT enabled router with an MPLS label stack.

21. The NAT enabled router according to claim 18, wherein the at least one processor is further configured to:
create a NAT translation entry for translation of the first source address in the routing table of the NAT enabled router to obtain a NAT translated first source address, when the forward packet is received; and
add the one or more identifiers to the created NAT translation entry to determine the return path for the return packet.

22. The NAT enabled router according to claim 21, wherein the one or more identifiers enable the NAT enabled router to route the return packet to the destination without performing an internet protocol (IP) header lookup for a second destination address included in the return packet, and wherein the second destination address corresponds to the NAT translated first source address of the forward packet.

* * * * *